United States Patent

[11] 3,565,070

| [72] | Inventors | Dale B. Hanson<br>Thousand Oaks;<br>Glenn R. Payton, Northridge; Carl L.<br>Stearns, Granada Hills; Charles G. Thiel,<br>Chatsworth; James A. Tolley, Los Angeles,<br>Calif. |
|---|---|---|
| [21] | Appl. No. | 803,312 |
| [22] | Filed | Feb. 28, 1969 |
| [45] | Patented | Feb. 23, 1971 |
| [73] | Assignee | Riker Laboratories, Inc.<br>Northridge, Calif. |

[54] INHALATION ACTUABLE AEROSOL DISPENSER
9 Claims, 7 Drawing Figs.

[52] U.S. Cl. .................................................. 128/173,
128/208, 128/211
[51] Int. Cl. .................................................. A61m 11/02,
A61m 15/00, A61m 15/06
[50] Field of Search .................................................. 128/173,
266, 208, 222, 185, 186, 195, 201, 225; 222/14,
22, 59, 61; 222/402.13, 402.14, 402.2; 128/211

[56] References Cited
UNITED STATES PATENTS

| 3,187,748 | 6/1965 | Mitchell et al. ................ | 128/173 |
| 3,456,645 | 7/1969 | Brock ............................ | 128/173 |
| 3,456,646 | 7/1969 | Phillips et al. ................. | 128/173 |
| 3,456,644 | 7/1969 | Thiel ............................. | 128/173 |
| 3,506,004 | 4/1970 | Mann et al. .................... | 128/208 |

Primary Examiner—Dalton L. Truluck
Assistant Examiner—J. B. Mitchell
Attorney—Kinney, Alexander, Sell, Steldt & Delahunt ABSTRACT: An inhalation actuable dispenser utilizing an aerosol medicament-dispensing container equipped with a metering valve movable between an inner, charging position and an outer, discharging position, and further equipped with a spring biasing the metering valve outwardly toward its discharging position. The dispenser includes a latch for releasably retaining the metering valve in its charging position in opposition to the biasing action of the spring, and includes an inhalation responsive vane for releasing the latch so that the spring moves the metering valve to its discharging position to deliver a metered amount of medicament to a stream of air being inhaled by a patient.

INVENTORS
DALE B. HANSON,
GLENN R. PAYTON,
CARL L. STEARNS,
CHARLES G. THIEL &
JAMES A. TOLLEY

BY THEIR ATTORNEYS
HARRIS, KIECH, RUSSELL & KERN

INVENTORS
DALE B. HANSON,
GLENN R. PAYTON,
CARL L. STEARNS,
CHARLES G. THIEL &
JAMES A. TOLLEY
BY THEIR ATTORNEYS
HARRIS, KIECH, RUSSELL & KERN

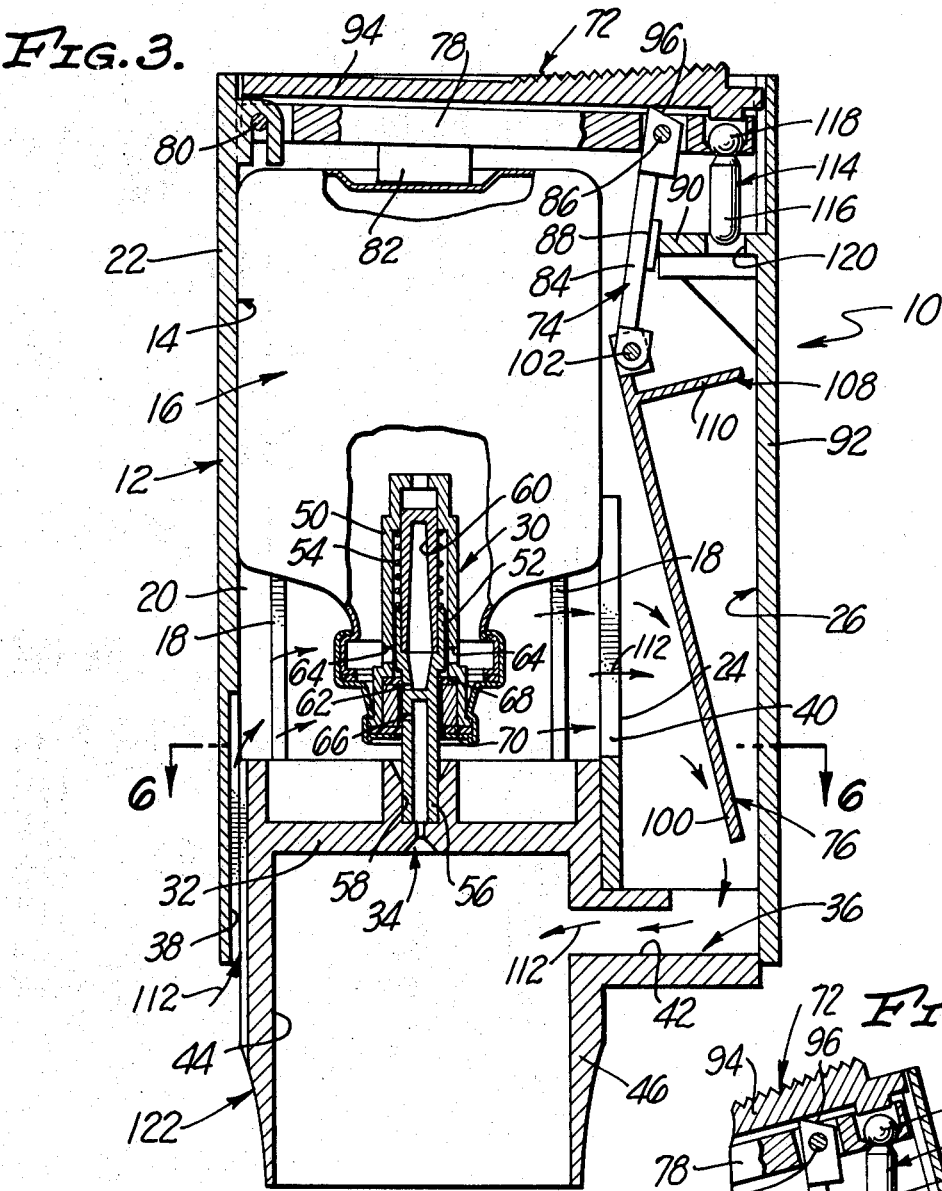
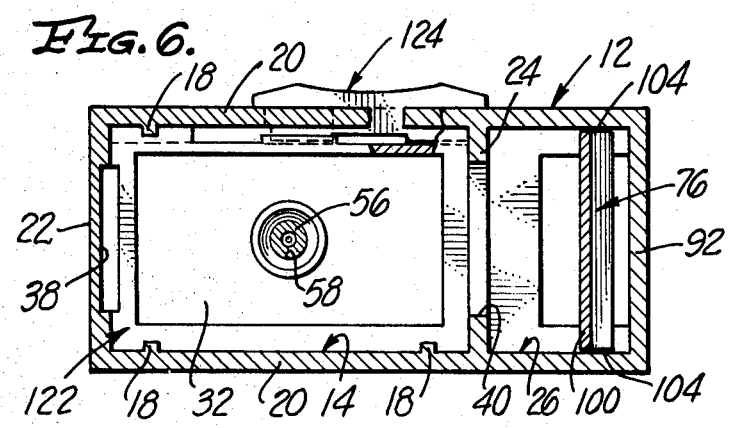

INHALATION ACTUABLE AEROSOL DISPENSER

BACKGROUND OF INVENTION

The present invention relates in general to an inhalation actuable dispenser for administering a metered quantity of a medicament to a patient in inhalation therapy, the medicament being carried by a self-propelling composition in an aerosol container.

More particularly, the invention contemplates an inhalation actuable dispenser which utilizes an aerosol medicament-dispensing container equipped with a metering valve means movable between a charging position and a discharging position, the metering valve means receiving a metered charge from the container when in its charging position and discharging the metered charge when in its discharging position. Such metered charge is dispensed into a stream of air being inhaled by the patient, preferably by mouth.

Conventionally, an inhalation actuable dispenser of the type under consideration includes a housing in which the aerosol container is movably mounted, the metering valve means being in communication with an air passage through the housing. The container is manually moved to and is latched in a position wherein the metering valve means is in its charging position. A spring means biases the container in a direction to position the metering valve means in its discharging position upon release of the latch means. The dispenser includes an inhalation responsive means, actuable in response to flow through an air passage through the housing, which flow is induced by inhalation by the patient, for releasing the latch means to produce the desired discharge into the stream of air being inhaled by the patient.

Prior inhalation actuable medicament dispensers of the foregoing type utilize an aerosol container equipped with a metering valve means which discharges in response to inward movement, relative to the container, into an inner, discharging position from an outer, charging position, the container being further equipped with a spring means which biases the metering valve means toward its outer, charging position. Consequently, such a prior dispenser must provide a separate spring means, externally of the aerosol container, for biasing the container in a direction to place the metering valve means in its discharging position upon release of the latch means.

SUMMARY AND OBJECTS OF INVENTION

In view of the foregoing background, a primary object of the invention is to provide an inhalation actuable medicament dispenser utilizing an aerosol container equipped with a metering valve means movable from an inner, charging position to an outer, discharging position by a spring means which biases the metering valve means outwardly.

With the foregoing construction, the spring means forming part of the aerosol valve may be used to effect the discharge stroke of the metering valve means in response to releasing of the latch means for holding the container in a position such as to retain the metering valve means in its inner, charging position. Thus, the inhalation actuable dispenser of the invention avoids any necessity for a separate spring means externally of the aerosol container, which is an important feature.

Summarizing the invention, an important object thereof is to provide an inhalation actuable medicament dispenser which utilizes an aerosol container equipped on one side thereof with a metering valve means movable between an inner, charging position and outer, discharging position, and further equipped with spring means biasing the metering valve means outwardly toward the discharging position, and which includes: a housing having therein a compartment for the container, having an air passage therethrough, and having therein a vane chamber adjacent the compartment and forming part of the air passage; a support in the housing engageable by the metering valve means and provided therein with passage means for conveying a discharge from the metering valve means to the air passage; charging means connected to the housing and engageable with the container on the side thereof opposite the metering valve means for moving the container toward the support to position the metering valve means in the charging position; latch means connected to and actuable by the charging means for releasably retaining the container in a position to retain the metering valve means in the charging position, in opposition to the biasing action of the spring means; and inhalation responsive vane means in the vane chamber and connected to the latch means, and actuable by air flowing through the air passage, for releasing the latch means so that the spring means moves the container away from the support to position the metering valve means in the discharging position, whereby the metering valve means discharges a metered amount from the container into the passage means leading to the air passage.

Another object of the invention is to provide cooperating means on the charging means and the latch means for displacing the latch means into its latching position in response to manual actuation of the charging means.

Still another object of the invention is to provide a construction wherein the latch means and the vane means comprise a toggle which is broken to release the latch means upon inhalation induced movement of the vane means.

A further object of the invention is to provide gravity responsive pendulum means for preventing operation of the charging means in the event of a deviation in the orientation of the dispenser relative to the vertical exceeding a predetermined amount.

The foregoing objects, advantages, features and results of the present invention, together with various other objects, advantages, features and results thereof which will be evident to those skilled in the inhalation actuable medicament dispenser art in the light of this disclosure, may be achieved with the exemplary embodiment of the invention illustrated in the accompanying drawings and described in detail hereinafter.

DESCRIPTION OF DRAWINGS

In the drawings:

FIGS. 1, 2, and 3 are similar vertical sectional views of an inhalation actuable, aerosol, medicament dispenser of the invention which are taken along the arrowed line 1-1 of FIG. 4, FIG. 1 showing the dispenser when not in use, FIG. 2 showing the dispenser charged and ready for use, and FIG. 3 showing the dispenser in the process of being discharged;

FIG. 6 is a horizontal sectional view taken as indicated by the arrowed line 6-6 of FIG. 3; and FIG. 7 is a fragmentary vertical sectional view duplicating a portion of FIG. 1, but showing the dispenser tilted so that a gravity responsive pendulum means precludes operation thereof.

DETAILED DESCRIPTION OF EXEMPLARY EMBODIMENT OF INVENTION

Figure 1:
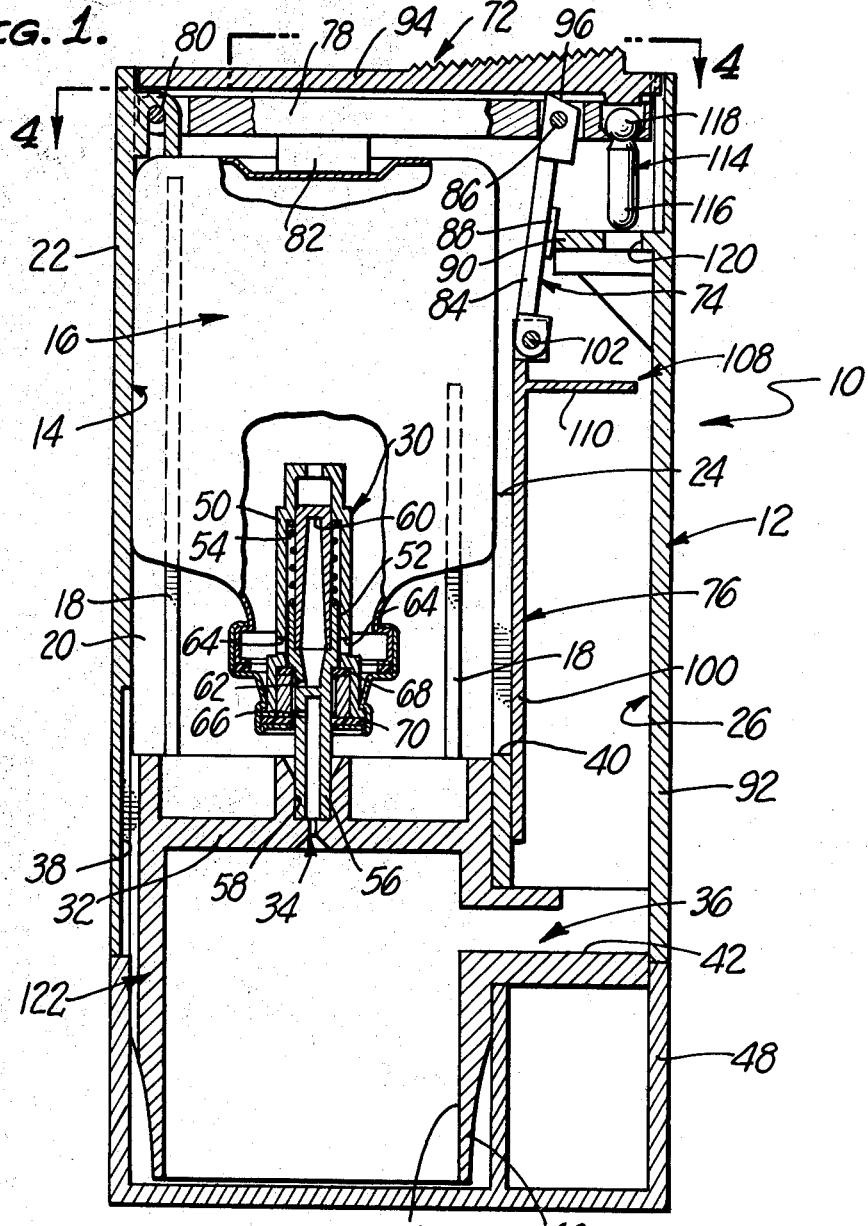
Figure 4:
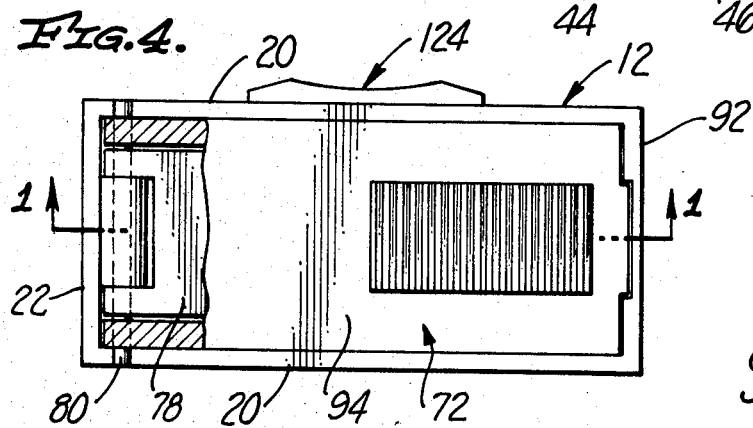
FIG. 4 is a view, partially in horizontal section and partially in top plan, taken as indicated by the arrowed line 4-4 of FIG. 1.
Figure 2:
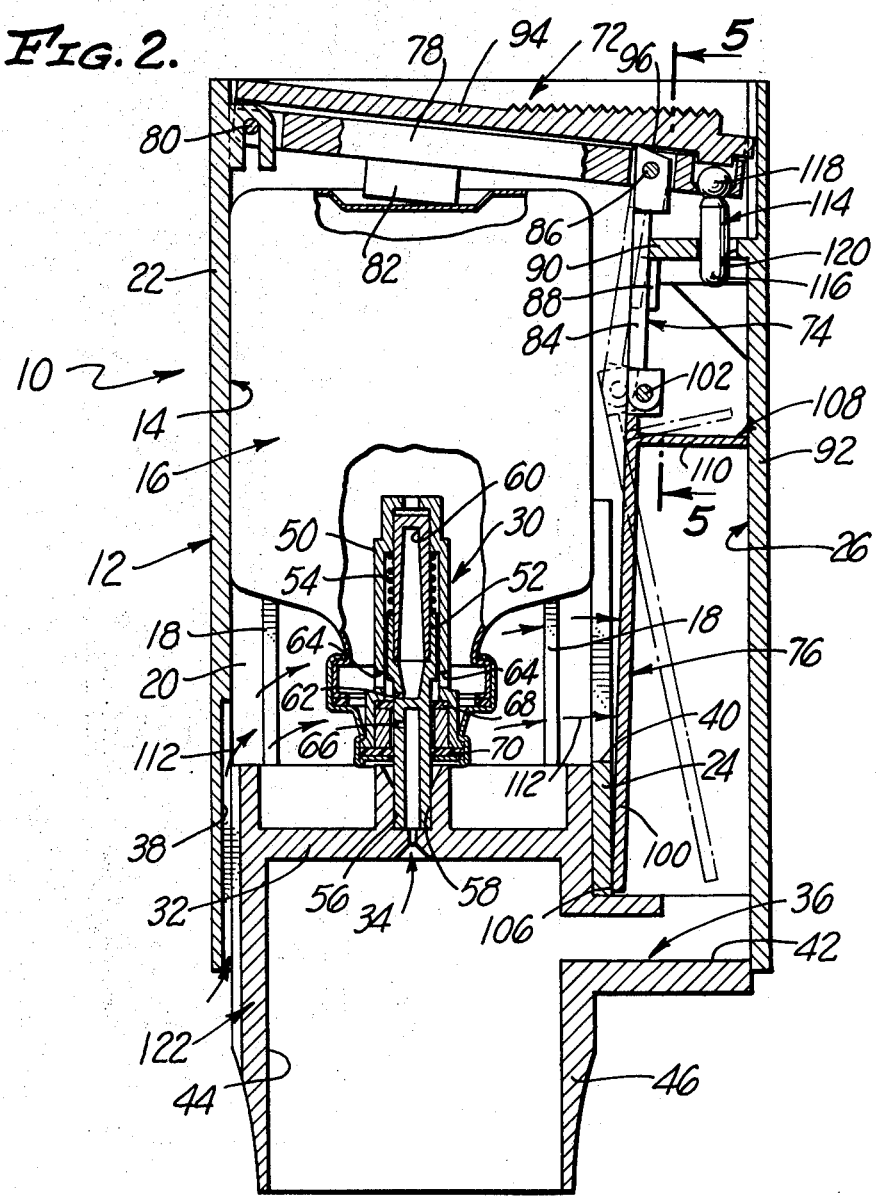

Referring particularly to FIGS. 1 to 3 of the drawings, the dispenser of the invention is designated generally by the numeral 10 and includes a housing 12 having therein a compartment 14 for an aerosol medicament dispensing container 16, the latter being charged with a self-propelling liquid composition including as one component thereof any desired medicament suitable for inhalation therapy.

The aerosol container 16 is slidable upwardly and downwardly in the compartment 14. More particularly, the container 16 slidably engages ribs 18 on front and rear walls 20 of the housing 12, a sidewall 22 thereof, and a partition 24 separating the container compartment 14 from a vane chamber 26 located alongside the container compartment and within the housing 12.

The aerosol container 16 is provided at its lower end with a metering valve means 30 seated on a support 32 which forms the lower wall of the container compartment 14 and which is provided therethrough with a passage means 34 for conveying a discharge from the metering valve means to an air passage 36 through the housing 12.

The air passage 36 has as its inlet a channel 38 formed in the sidewall 22 of the housing 12 and communicating with the lower end of the container compartment 14. The air passage 36 includes the lower portions of the container compartment 14 and the vane chamber 26, the latter being interconnected by an opening 40 in the partition 24. From the lower end of the vane chamber 26, air may flow through a lateral passage 42 to the outlet 44 of the air passage 36, such outlet being formed in a mouthpiece 46. The passage means 34 from the metering valve means 30 is directed into the outlet 44 of the air passage 36 to insure inhalation of the entire metered charge dispensed into the stream of air flowing through the air passage and being inhaled by the patient.

When the dispenser 10 is not in use, the mouthpiece 46 is enclosed and covered by a cap 48 telescoped over the lower end of the housing 12, as shown in FIG. 1 of the drawings. When the dispenser 10 is in use, the cap 48 is removed, as shown in FIG. 2 and 3 of the drawings.

The metering valve means 30 with which the aerosol container 16 is equipped is essentially the same as that illustrated in FIG. 7 of U.S. Pat. No. 2,980,301, granted Apr. 18, 1961 to Benjamin De Gorter, reference to which is hereby made for a complete disclosure. (Alternatively, the metering valve means of copending application Ser. No. 805,534, filed Mar. 10, 1969 by Carl L. Stearns, and assigned to the same assignee as this application, may be used.) Briefly, the metering valve means 30 includes a housing 50 in which a metering valve 52 is reciprocable between an outer, discharging position, FIGS. 1 and 3, and an inner, charging position, FIG. 2. The metering valve 52 is biased outwardly toward its discharging position by a spring means comprising a coil spring 54 encircling the metering valve 52 and acting in compression between it and the housing 50. The metering valve 52 is provided outwardly of the aerosol container 16 with a tube 56 seated in a socket 58 in the support 32 and communicating with the passage means 34.

The metering valve 52 is provided therein with a metering chamber 60 which communicates with the interior of the aerosol container 16 through a port 62 in the metering valve and ports 64 in the housing 50 when the metering valve is in its charging position, as shown in FIG. 2. The metering valve 52 is provided with a second port 66 below the port 62 and communicating with the outer tube 56. When the metering valve 52 is in its charging position, as shown in FIG. 2, communication between the ports 62 and 66 is prevented by an upper seal 68. When the metering valve 52 is in its discharging position, as shown in FIG. 3, for example, the ports 62 and 66 both communicate with an annulus between the upper seal 68 and a lower seal 70 so that the metering chamber 60 can discharge into the outer tube 56, and thence through the passage means 34 into the outlet 44 in the mouthpiece 46.

As will be apparent from the foregoing, the metering chamber 60 is charged in the charging position of the metering valve 52, as shown in FIG. 2. The metering chamber 60 is discharged when the metering valve 52 is in its discharging position, as shown in FIG. 3. (It will be understood that the hereinbefore-mentioned charging and discharging positions of the metering valve 52 are with reference to the aerosol container 16. Actually, the metering valve 52 itself does not move, but the aerosol container 16 moves relative to the metering valve to produce the effect of placing the metering valve in its charging position, or its discharging position, relative to the aerosol container.) The compression spring 54 biases the aerosol container 16 upwardly to tend to place the metering valve 52 in its discharging position relative to the aerosol container, as shown in FIG. 3 of the drawings. More particularly, it is important to note that the compression spring 54 biases the aerosol container 16 in a direction to bias the metering valve 52 outwardly, relative to the container, toward its discharging position.

The dispenser 10 includes, in addition to the foregoing components, a manually operable cocking means 72 connected to the housing 12 and engageable with the upper end of the aerosol container 16 and opposite the metering valve means 30 for moving the container toward the support 32 to place the metering valve 52 in its charging position relative to the container, as shown in FIG. 2. (Since the cocking means 72 serves to place the metering valve 52 in its charging position, it is also referred to herein as a charging means.) A latch means 74 connected to and actuable by the cocking or charging means 72 serves to releasably retain the aerosol container 16 in a position to retain the metering valve 52 in its charging position relative to the container, in opposition to the biasing action of the compression spring 54. This is also shown in FIG. 2 of the drawings. The dispenser 10 further includes inhalation responsive vane means 76, located in the vane chamber 26 and connected to the latch means 74 and actuable by an inhalation-induced air flow through the air passage 36, for releasing the latch means 74 so that the compression spring 54 moves the aerosol container 16 away from the support 32 to place the metering valve 52 in its discharging position relative to the container, as shown in FIG. 3 of the drawings. The result is that the metering valve means 30 discharges a metered quantity from the aerosol container 16 into the passage means 34 leading to the outlet 44 of the air passage 36, whereupon the metered discharge is inhaled by the patient.

Considering the cocking or charging means 72 more specifically now, it includes a charging lever 78 which overlies the container compartment 14 and the vane chamber 16 and which is pivotally connected at one end to the side wall 22 of the container compartment by a pivot pin 80. The charging lever 78 is provided intermediate its ends with a projection 82 which is engageable with the upper end of the aerosol container 16. As will be apparent, when the charging lever 78 is pivoted downwardly, as shown in FIG. 2 of the drawings, it displaces the aerosol container 16 downwardly to, in effect, displace the metering valve 52 into its inner, charging position in opposition to the action of the compression spring 54.

The latch means 74 includes a depending latch member 84 pivotally connected at its upper end, at 86, to the charging lever 78 adjacent the free end thereof. The latch member 84 is provided thereon intermediate its upper and lower ends with a latch element 88 insertable under and engageable with a keeper 90 projecting inwardly into the housing 12 from a sidewall 92 thereof opposite the sidewall 22. As will be apparent, when the latch element 88 is in engagement with the keeper 90, the aerosol container 16 is latched in its lower position, wherein the metering valve 52 is in its charging position relative to the aerosol container.

Figure 5:
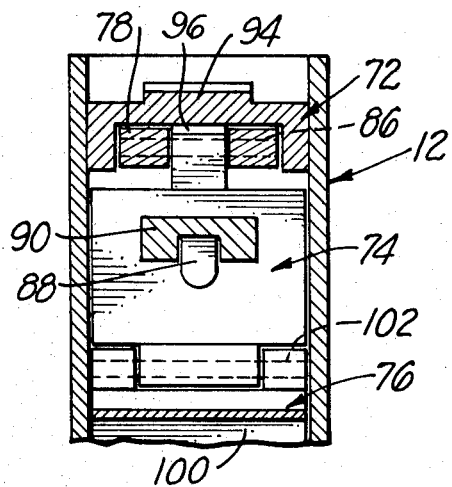
FIG. 5 is a fragmentary vertical sectional view taken as indicated by the arrowed line 5-5 of FIG. 2.

The latch means 74 further includes a latching lever 94 overlying the charging lever 78 and pivotally connected to the housing 12 by the same pivot pin 80 as the charging lever. The latching lever 94 is channel-shaped in cross section, as shown in FIG. 5, and receives the charging lever 78 between the laterally spaced flanges thereof.

The latch means 74 includes a cam means for pivoting the latch member 84 in a direction to engage the latch element 88 with the keeper 90 in response to downward movement of the latch member. Such cam means comprises an inclined cam surface 96 on the upper end of the latch member 84 and engageable by the latching lever 94. As will be apparent from a comparison of FIGS. 1 and 2 of the drawings, downward pivoting of the latching lever 94 causes this lever to engage the upper end of the inclined cam surface 96 to swing the latch element 88 under the keeper 90 as the latch member 84 is moved downwardly.

The vane means 76 includes a vane 100 which is pivotally connected to the lower end of the latch member 84, at 102, and which depends from the latch member. As best shown in FIG. 6, the vane 100 has edges 104 in close proximity to the respective front and rear walls of the vane chamber 26 to minimize the bypassing of air around the edges of the vane upon inhalation by a patient through the mouthpiece 46.

The vane 100 is pivotable relative to the latch member 84 between blocking and unblocking positions, respectively shown in FIGS. 2 and 3 of the drawings, wherein it respectively blocks and unblocks the air passage 36. When the vane 100 is in its blocking position, FIG. 2, the lower end thereof is seated against the partition 24 between the container compartment 14 and the vane chamber 26, as indicated at 106.

The vane means 76 includes, in addition to the vane 100, release means 108 for disengaging the latch element 88 from the keeper 90 in response to pivotal movement of the vane from its blocking position, FIG. 2, to its nonblocking position, shown in broken lines in FIG. 2 and in solid lines in FIG. 3, by air flowing through the air passage 36. The release means 108 includes a fulcrum 110 acting between the sidewall 92 of the housing 12 and the vane 100 adjacent the pivotal connection 102 between the vane and the latch member 84. In the construction illustrated, the fulcrum 110 is carried by the vane 100 adjacent the pivot 102 and projects laterally from the vane into engagement with the sidewall 92 when the vane is in its blocking position.

It will be noted that, when the vane 100 is in its blocking position as shown in FIG. 2 of the drawings, the pivot 102 is slightly to the right of a line between the pivot 86 and the point 106 of contact between the vane 100 and the partition 24. Thus, the latch member 84 and the vane 100 form a toggle which is slightly over center in the blocking position of the vane, over center movement of the pivot 102 being limited by engagement of the fulcrum 110 with the sidewall 92.

When the patient inhales through the mouthpiece 46, air flows through the air passage 36, as indicated by the arrows 112, to pivot the vane 100 from its blocking position to its nonblocking position. In doing this, the vane 100 pivots about the fulcrum 110 to displace the pivot 102 to the left of a line between the pivot 86 and the point 106 of engagement between the vane and the partition 24, thereby breaking the aforementioned toggle.

As the toggle is broken in the foregoing manner, the leftward movement of the pivot 102 between the vane 100 and the latch member 84 results in disengagement of the latch element 88 from the keeper 90, whereupon the compression spring 54 in the metering valve means 30 displaces the aerosol container 16 upwardly to cause the metering valve means to discharge into the stream of air flowing through the mouthpiece 46. This has the desired effect of administering a metered quantity of the medicament in the aerosol container 16 to the patient by inhalation.

An important feature of the invention is that the desired dose is administered, upon releasing of the latch element 88 from the keeper 90 in response to inhalation by the patient, solely by the compression spring 54 incorporated in the metering valve means 30. Thus, no separate spring means is necessary. The compression spring 54 also returns the various parts to their initial positions, as shown in FIG. 1, thereby readying the dispenser 10 for subsequent use.

In order to insure the introduction of a complete charge of the liquid composition in the aerosol container 16 into the metering chamber 60 upon relative movement of the metering valve 52 into its charging position, this should be done with the dispenser 10 in its upright position. To preclude movement of the aerosol container 16 toward the support 32 in any position of the dispenser 10 other than a substantially upright one, the dispenser is provided with a gravity responsive pendulum means 114 which prevents inward pivoting of the charging and latching levers 78 and 94 in the event of a deviation in the orientation of the dispenser 10 relative to the vertical exceeding a predetermined amount. The pendulum means 114 comprises a pendulum member 116 freely suspended from the outer end of the charging lever 78 by means of a ball-and-socket joint 118. When the dispenser 10 is upright within permitted tolerances, the pendulum member 116 is inserted downwardly through a hole 120 in the keeper 90 in response to downward pivoting of the charging and latching levers 78 and 94. On the other hand, if the dispenser 10 is tilted excessively, as shown in FIG. 7, the lower end of the member 116 will strike the keeper 90 to prevent actuation of the charging means 72.

The mouthpiece 46 and the support 32 for the metering valve means 30 comprise a separate member 122 which forms part of the housing 12 and which is telescoped into the lower ends of the container compartment 14 and the vane chamber 26. The member 122 is releasably secured to the remainder of the housing 12 by a suitable latch means 124, FIG. 6. Upon releasing the latch means 124 and removing the member 122, the aerosol container 16 can be removed, when empty, and replaced with a full one.

Although an exemplary embodiment of the invention has been disclosed herein for purposes of illustration, it will be understood that various changes, modifications, and substitutions may be incorporated in such embodiment without departing from the spirit of the invention as defined by the claims appearing hereinafter.

We claim:

1. In an inhalation actuable dispenser for use with an aerosol dispensing container equipped with a metering valve means movable between an inner, charging position and an outer, discharging position, and further equipped with spring means biasing said metering valve means outwardly toward said discharging position, the improvement comprising:
   a. a housing having therein a compartment receiving said container and having an air passage therethrough with which said metering valve means communicates;
   b. means carried by said housing and engageable with said container and said metering valve means for relatively moving said container and said metering valve means into said charging position of said metering valve means;
   c. latch means for releasably retaining said metering valve means in said charging position in opposition to the biasing action of said spring means; and
   d. inhalation responsive means in said air passage, and actuable by air flowing therethrough, for releasing said latch means so that said spring means produces relative movement of said container and said metering valve means into said discharging position of said metering valve means, whereby said metering valve means discharges a metered amount from said container into said air passage.

2. In an inhalation actuable dispenser for use with an aerosol dispensing container equipped on one side thereof with a metering valve means movable between an inner, charging position and an outer, discharging position, and further equipped with spring means biasing said metering valve means outwardly toward said discharging position, the improvement comprising:
   a. a housing having therein a compartment receiving said container, having an air passage therethrough, and having therein a vane chamber adjacent said compartment and forming part of said air passage;
   b. a support in said housing engageable by said metering valve means and provided therein with passage means for conveying a discharge from said metering valve means to said air passage;
   c. charging means connected to said housing and engageable with said container on the side thereof opposite said metering valve means for moving said container toward said support to position said metering valve means in said charging position;
   d. latch means connected to and actuable by said charging means for releasably retaining said container in a position to retain said metering valve means in said charging position, in opposition to the biasing action of said spring means; and
   e. inhalation responsive vane means in said vane chamber and connected to said latch means, and actuable by air flowing through said air passage, for releasing said latch means so that said spring means moves said container away from said support to position said metering valve means in said discharging position, whereby said metering valve means discharges a metered amount from said container into said passage means leading to said air passage.

3. An inhalation actuable dispenser as defined in claim 2 wherein:
   a. said charging means includes a charging lever pivotally connected at one end to said housing adjacent said compartment and engageable intermediate its ends with said one side of said container, said charging lever having a free end registering with said vane chamber; and
   b. said latch means includes a latch member pivotally connected at one end to said charging lever adjacent said free end thereof and having its other end pivotally connected to said vane means in said vane chamber, said latch member being provided thereon intermediate its ends with a latch element and said housing being provided thereon with a keeper engageable by said latch element to releasably retain said container in a position to retain said metering valve means in said charging position.

4. An inhalation actuable dispenser according to claim 3 wherein:
   a. said latch means includes an actuating lever pivotally connected at one end to said housing adjacent said compartment and having a free end aligned with said vane chamber; and
   b. said latch member is provided at said one end thereof with cam means engageable and actuable by said free end of said actuating lever for pivoting said latch member in a direction to engage said latch element thereon with said keeper.

5. An inhalation actuable dispenser as set forth in claim 4 wherein:
   a. said charging lever and said actuating lever are disposed in side-by-side relation with said actuating lever outwardly of said charging lever;
   b. a common pivot means pivotally connects said actuating liver and said charging lever to said housing adjacent said compartment; and
   c. said actuating lever, when displaced, displaces said charging lever through said latch member.

6. An inhalation actuable dispenser according to claim 2 wherein:
   a. said latch means includes a latch member pivotally connected at one end to said charging means and having its other end pivotally connected to said vane means in said vane chamber, said housing being provided thereon with a keeper and said latch member being provided thereon intermediate its ends with a latch element engageable with said keeper to releasably retain said container in a position to retain said metering valve means in said charging position; and
   b. said charging means including means for pivoting said latch member about said one end thereof to engage said latch element thereon with said keeper in response to movement of said container toward said support to position said metering valve means in said charging position.

7. An inhalation actuable dispenser as defined in claim 6 wherein said vane means includes:
   a. a vane in said vane chamber and pivotally connected at one end to said other end of said latch member, said vane being pivotable relative to said latch member between blocking and nonblocking positions relative to said air passage; and
   b. release means for disengaging said latch element from said keeper in response to pivotal movement of said vane from said blocking position to said nonblocking position by air flowing through said air passage.

8. An inhalation actuable dispenser as set forth in claim 7 wherein said release means includes a fulcrum acting between said housing and said vane adjacent the pivotal connection of said vane to said latch member, said fulcrum being carried by said vane.

9. An inhalation actuable dispenser according to claim 2 including gravity responsive pendulum means for preventing operation of said charging means in the event of a deviation in the orientation of said dispenser relative to the vertical exceeding a predetermined amount.